(No Model.)

H. A. TRENCH.
Sifter.

No. 237,419. Patented Feb. 8, 1881.

WITNESSES:
Irving Dickinson.
J. S. Acker Jr.

INVENTOR,
Henry A. Trench
By David A. Burr
Atty.

UNITED STATES PATENT OFFICE.

HENRY A. TRENCH, OF NEW YORK, N. Y., ASSIGNOR OF FIFTY ONE-HUNDREDTHS TO IRA J. TRENCH, OF SAME PLACE.

SIFTER.

SPECIFICATION forming part of Letters Patent No. 237,419, dated February 8, 1881.

Application filed December 30, 1880. (No model.)

*To all whom it may concern:*

Be it known that I, HENRY A. TRENCH, a resident of the city, county, and State of New York, have invented certain new and useful Improvements in Sifters; and I do hereby declare that the following is a full, clear, and exact description thereof, reference being had to the accompanying drawings, and to the letters of reference marked thereon, making a part of this specification.

My invention relates to an improvement in apparatus for sifting coal-ashes.

It consists in the combination, with a detachable cover provided with a hinged lid and made to fit closely upon a suitable vessel for receiving the sifted ashes, of a basket or sieve suspended from the cover by means of a central crank-lever passing through the cover and supported by a fixed bracket upon the outside thereof.

Figure 1:
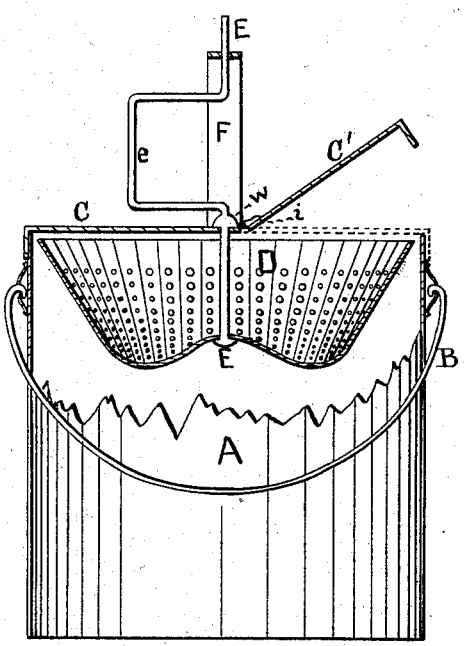
Figure 2:
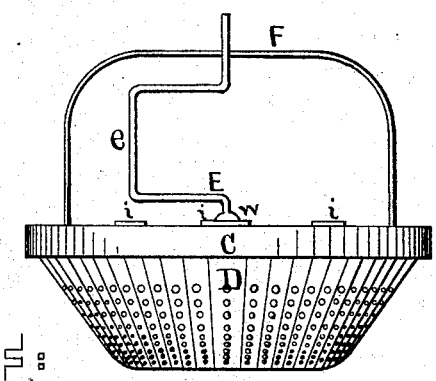

In the accompanying drawings, Figure 1 is a central vertical section of my improved apparatus; Fig. 2, an elevation of the detachable cover and sifter removed from the ash-vessel.

A is an open cylindrical vessel for receiving the sifted ashes, and B a swinging bail by which the vessel is easily carried.

C is a cover, made to fit closely upon the open top of the vessel A, and having one side thereof, C', hinged, so as to lift up.

D is a deep circular metallic ash-sieve, constructed with outwardly-flaring sides. The bottom of the sieve is preferably made concavo-convex in form, so as to project inwardly at the center. (See Fig. 1.) The diameter of the sieve is slightly less than that of the vessel A, so that it may drop loosely therein. This sieve D is attached to the lower end of a crank rod or lever, E, which is secured to the bottom of the sieve at the center thereof, and passes loosely through the center of the cover C and through a bracket or curved cross-bar, F, which spans the cover diametrically from side to side, as shown in Fig. 2 of the drawings. The lever is bent between the cross-bar and the cover, to form the crank-arm e, and is provided with a shoulder, w, which, resting upon the outside of the cover C, forms a bearing for the crank and sieve. The lid C' of the cover is hinged at i upon one side of the bearing w. The sieve is suspended and supported by the crank-rod E immediately beneath the cover C, and is reached by lifting the lid C'.

In use the cover C, with its attached sieve, is placed upon the top of the vessel A. The sieve is thereby suspended concentrically within the vessel, immediately under its cover, and the cover closes the vessel tightly, so that no ashes can fly out therefrom. By lifting the lid C' the sieve may be filled with the ashes to be sifted. The lid being closed, the sieve is readily oscillated by means of the crank e until the ashes are separated from the cinders, the former dropping into the bottom of the vessel A and the latter remaining in the sieve, any escape of dust during the operation being prevented by the close fit of the cover C upon the vessel A. When the ashes have thus been sifted the cover C is taken off, and the cinders remaining in the sieve readily removed from the sieve by lifting the lid C'.

Although this apparatus is specially designed for use in sifting coal-ashes, it is adapted for use in sifting grain and other materials.

I do not claim, broadly, the oscillation of a sieve in an inclosing-vessel by means of an outer crank; but

What I claim as new, and desire to secure by Letters Patent, is—

The combination, with a removable cover, C, adapted to fit upon and close the top of an open vessel, A, of a crank, E, projecting outwardly from said cover, and carrying a sieve dependent from said crank upon the under side of the cover, substantially as and for the purpose herein set forth.

In testimony whereof I have signed my name to this specification in the presence of two subscribing witnesses.

HENRY A. TRENCH.

Witnesses:
J. F. ACKER, Jr.,
IRVING DICKINSON.